(12) United States Patent
Wigard et al.

(10) Patent No.: US 11,129,229 B2
(45) Date of Patent: Sep. 21, 2021

(54) METHOD AND APPARATUS FOR WIRELESS DEVICE CONNECTIVITY MANAGEMENT

(71) Applicant: NOKIA TECHNOLOGIES OY, Espoo (FI)

(72) Inventors: Jeroen Wigard, Klarup (DK); Istvan Z. Kovacs, Aalborg (DK); Thomas Jacobsen, Aalborg Ost (DK); Daniela Laselva, Klarup (DK); Poul Larsen, Ringsted (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/346,713

(22) PCT Filed: Nov. 1, 2016

(86) PCT No.: PCT/FI2016/050761
§ 371 (c)(1),
(2) Date: May 1, 2019

(87) PCT Pub. No.: WO2018/083368
PCT Pub. Date: May 11, 2018

(65) Prior Publication Data
US 2020/0059990 A1  Feb. 20, 2020

(51) Int. Cl.
| *H04W 76/36* | (2018.01) |
| *H04W 76/18* | (2018.01) |
| *H04W 76/38* | (2018.01) |
| *H04W 24/08* | (2009.01) |

(52) U.S. Cl.
CPC .......... *H04W 76/36* (2018.02); *H04W 24/08* (2013.01); *H04W 76/18* (2018.02); *H04W 76/38* (2018.02)

(58) Field of Classification Search
CPC ..... H04W 76/36; H04W 76/18; H04W 76/38; H04W 24/08; H04W 60/06; H04W 24/02;
(Continued)

(56) References Cited

U.S. PATENT DOCUMENTS

| 7,860,976 B2 | 12/2010 | Hurtta |
| 7,894,346 B2 | 2/2011 | Kim et al. |

(Continued)

FOREIGN PATENT DOCUMENTS

| CN | 102892179 A | 1/2013 |
| CN | 103763762 A | 4/2014 |

(Continued)

OTHER PUBLICATIONS

International Search Report and Written Opinion for Application No. PCT/FI2016/050761 dated Feb. 10, 2017, 21 pages.
(Continued)

*Primary Examiner* — Jae Y Lee
(74) *Attorney, Agent, or Firm* — Alston & Bird LLP

(57) ABSTRACT

A method, apparatus and computer program are disclosed that perform in a wireless network: monitoring radio network connectivity release requests received from a wireless device of a given subscriber of the wireless network; determining a radio network connectivity release request frequency based on the radio network connectivity release requests received from the wireless device; receiving a current radio network connectivity release request from the wireless device; determining whether the radio network connectivity release request frequency meets a first threshold and: if yes, taking first corrective action to mitigate network load by excessive radio network connectivity release requests.

14 Claims, 4 Drawing Sheets

(58) Field of Classification Search
CPC .......... Y02D 70/1262; Y02D 70/1242; Y02D 70/1224; Y02D 70/142; Y02D 70/144; Y02D 70/21; Y02D 70/00
See application file for complete search history.

(56) References Cited

U.S. PATENT DOCUMENTS

| | | | |
|---|---|---|---|
| 7,969,864 | B2 | 6/2011 | Nylander et al. |
| 8,934,334 | B2 | 1/2015 | Kim et al. |
| 9,226,256 | B2 | 12/2015 | Velev et al. |
| 9,247,484 | B2 | 1/2016 | Youtz et al. |
| 9,392,566 | B2 | 7/2016 | Tranberg et al. |
| 2013/0003577 | A1 | 1/2013 | Gupta et al. |
| 2014/0105011 | A1* | 4/2014 | Chandramouli ........ H04W 4/08 370/230 |
| 2014/0295824 | A1 | 10/2014 | Madasamy |
| 2015/0201454 | A1 | 7/2015 | Shukair et al. |
| 2016/0029246 | A1* | 1/2016 | Mishra .................. H04L 47/12 370/235 |
| 2016/0092246 | A1* | 3/2016 | Lagerblad ........... G06F 9/44526 719/331 |

FOREIGN PATENT DOCUMENTS

| | | |
|---|---|---|
| EP | 2 003 919 A1 | 12/2008 |
| WO | WO 2014/019139 A1 | 2/2014 |

OTHER PUBLICATIONS

3GPP TS 25.331 V14.0.0 (Sep. 2016), $3^{rd}$ Generation Partnership Project; Technical Specification Group Radio Access Network; Radio Resource Control (RNC); Protocol Specification; (Release 14), Oct. 5, 2016, 2276 pages.
3GPP TS 24.301 V14.0.1 (Jun. 2016) $3^{rd}$ Generation Partnership Project; Technical Specification Group Core Network and terminals; Non-Access-Stratum (NAS) Protocol for Evolved Packet System (EPS) Stage 3 (Release 14), Jun. 2016) 452 pages.
*IoT Device Connection Efficiency Guidelines, Version 1.0*, GSM Association (Oct. 13, 2014) 73 pages.
*Setting Mobile Reachable Timer, Implicit Detach Timer*, 3GPP TSG CT WG1 Meeting #75, C1-114712 (Nov. 2011), 5 pages.
Extended European Search Report for Application No. EP 16 92 0669 dated Jun. 2, 2020, 11 pages.
3GPP TR 23.887 V0.9.0, $3^{rd}$ Generation Partnership Project; Technical Specification Group Services and System Aspects; Machine-Type and Other Mobile Data Applications Communications Enhancements (Release 12) (Apr. 2013, 121 pages.
3GPP TS 24.301 V14.1.0, $3^{rd}$ Generation Partnership Project; Technical Specification Group Core Network and Terminals; Non-Access-Stratum (NASW) Protocol for Evolved Packet System (EPS); Stage 3 (Release 14) (Sep. 2016) 460 pages.
Office Action for European Application No. 16920669.5 dated Jun. 7, 2021, 7 pages.

* cited by examiner

Fig. 1    100
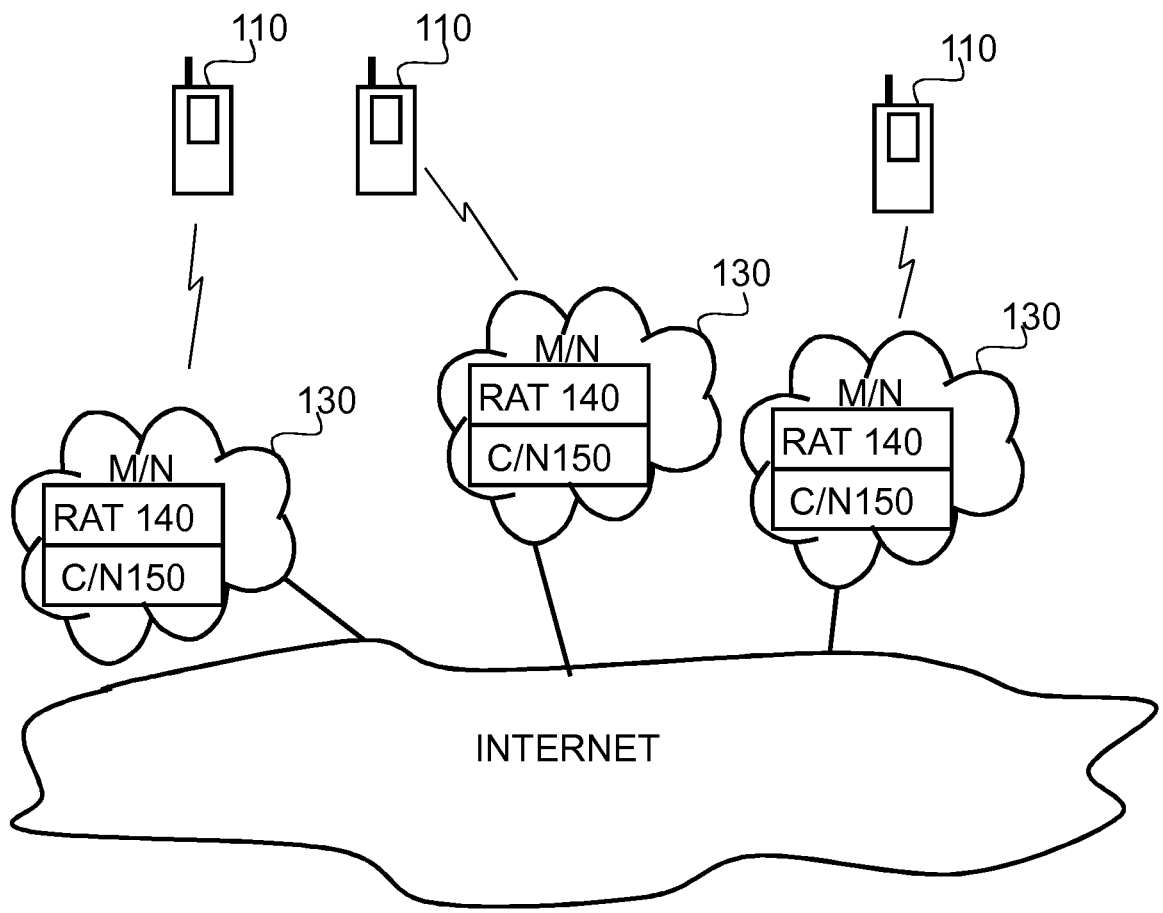
Fig. 2    200
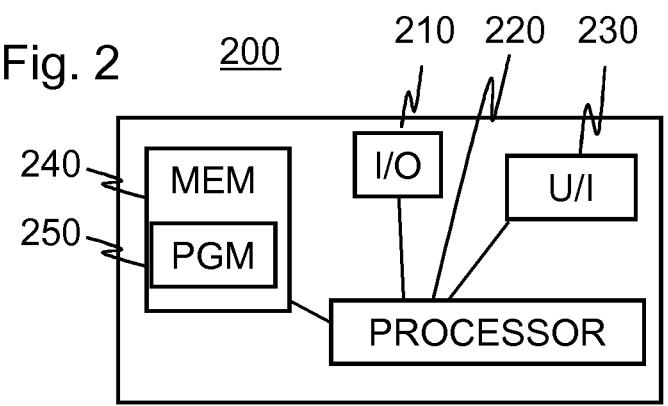

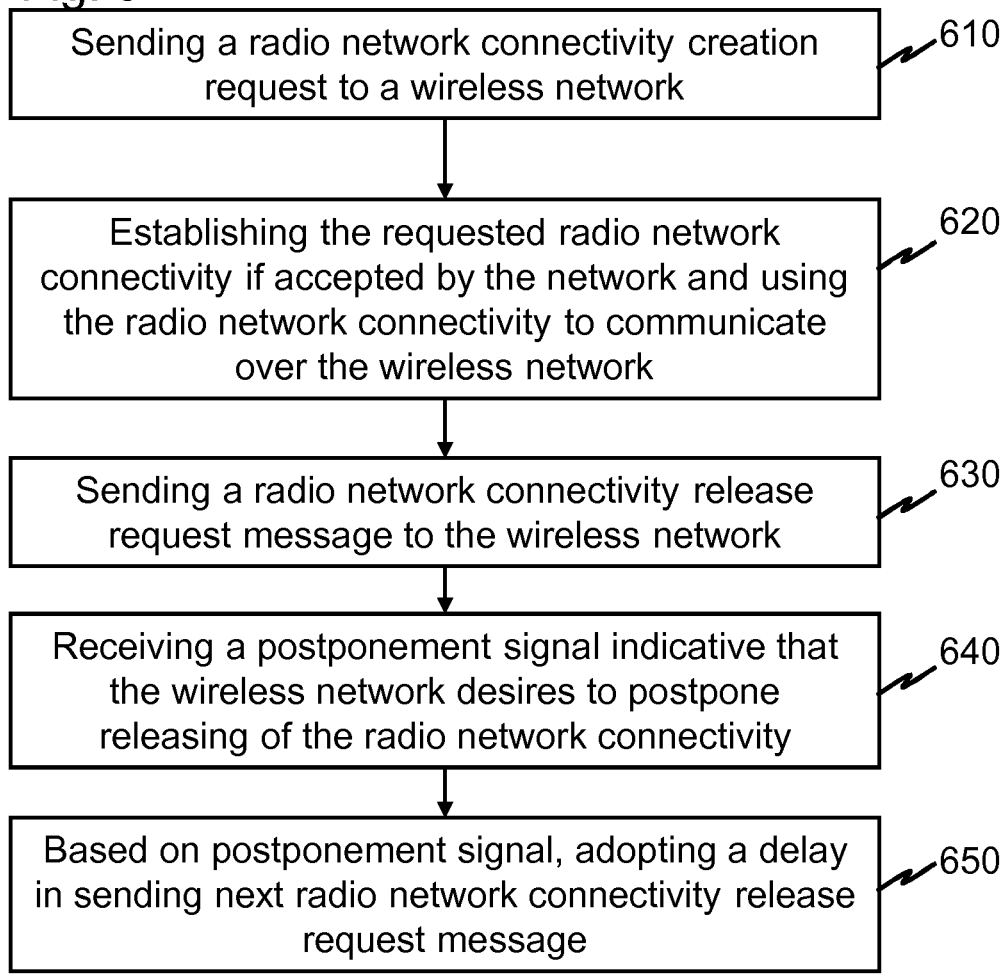

METHOD AND APPARATUS FOR WIRELESS DEVICE CONNECTIVITY MANAGEMENT

CROSS-REFERENCE TO RELATED APPLICATIONS

The present application is a national phase entry of International Application No. PCT/FI2016/050761, filed Nov. 1, 2016, all of which is incorporated herein by reference in its entirety.

TECHNICAL FIELD

The present application generally relates to wireless device connectivity management in a wireless access system.

BACKGROUND

This section illustrates useful background information without admission of any technique described herein representative of the state of the art.

Internet of Things (IoT) devices communicate over the Internet. To this end, they may connect to the Internet over wireless local area networks (WLAN) or cellular networks, for example. In order to gain connectivity, the IoT devices may register to a wireless network to gain physical access and an Internet Protocol (IP) address. In case of WLAN, the connection may be maintained continuously unless there is a need to spare energy, for example, but in case of cellular network access, the connection is often established only for a short period in order to transfer data or become available to receive data.

An IoT device using a cellular network such as the General Packet Radio Service (GPRS) of GSM, Universal Mobile Telecommunications System (UMTS), the Long-Term Evolution (LTE) or a 5G system, may perform a registration or attach procedure to gain access and thereafter detach to release any network resources assigned to the IoT device. For example, in Code Division Multiple Access networks, the multiple accessing of shared radio resource employs particular channel codes that enable coding and decoding of data for radio transmission. Moreover, each Internet device needs an Internet address, which may be also a temporary address (e.g. using Network Address Translation NAT to share smaller number of public IP addresses). The basic connectivity of a device to a wireless network starts with an attach procedure and terminates with a detach procedure.

The use of cellular networks is typically cost-bearing. There is a wide variety in the charging criteria: the networks may charge based on any of: amount of data transferred, duration of data sessions i.e. the time over which the subscribers have been attached to the network, fixed charge for given time/quantity of data, etc. As the user devices (such as IoT devices) are often manufactured without knowledge of the future network operator and charging scheme, some user devices may be configured to attach to the network only for the bare minimum time and then immediately detach again. Such behavior is also favored in many battery operated wireless devices are in attempt to reduce power consumption. However, this may cause an unforeseen problem in the future if excessive amounts of user devices send detach requests to tear down their connectivity sessions and then again request attaching for transfer of new information as triggered by some events. In result, the network may be burdened with excessive signaling especially when new attach requests are sent within a short while such as a few seconds after detach requests. This problem may arise even though the user devices would basically comply with relevant standards but the behavior of certain devices such as machine type IoT devices differs too much from that of mobile phones used by human beings. Further, some applications in mobile phones can also trigger sporadic transmission of small amounts of data similar to IoT device traffic patterns.

Some networks prevent attach request flooding by non-subscriber user equipment by refusing to engage into attach requests when sent in too rapid a succession. However, the mechanism (using a dedicated timer) used for such non-subscriber attach requests cannot help in resolving problems caused by actual subscribers that simply continue to send too many attach requests. In general, traffic curtailing solutions may impair normal use of wireless devices as connectivity may then be missing when needed. For such subscribers, a mechanism is needed to manage connectivity such that the subscribers gain necessary network access while not drowning the network with flooding attach/detach requests.

SUMMARY

Various aspects of examples of the invention are set out in the claims.

According to a first example aspect of the present invention, there is provided a method in a wireless access network comprising:

monitoring radio network connectivity release requests received from a wireless device of a given subscriber of the wireless network;

determining a radio network connectivity release request frequency based on the radio network connectivity release requests received from the wireless device;

receiving a current radio network connectivity release request from a wireless device of a given subscriber of the wireless network;

determining whether the radio network connectivity release request frequency meets a first threshold and:

if yes, taking first corrective action to mitigate network load by excessive radio network connectivity release requests.

The meeting of a threshold may refer to reaching a threshold. Alternatively, the meeting of a threshold may refer to exceeding a threshold.

The radio network connectivity release request may request release of a non-access stratum connection. The radio network connectivity release request may be a detach request.

The radio network connectivity release request may request release of a radio resource control connection. The radio network connectivity release request may be a radio resource control connection release request.

The first corrective action may comprise or be responding to the current radio network connectivity release request with a radio network connectivity release reject message indicating that the wireless device should maintain its wireless device connectivity context with the network despite of the current radio network connectivity release request. Alternatively, the first corrective action may comprise or be any of: neglecting the current radio network connectivity release request; suspending the connectivity with a suspend command from the wireless network; increasing the delay during which the wireless device should not send new radio network connectivity release requests; sending a keep-alive transmission to the wireless device during the delay; and sending a keep-alive transmission to a given port of the wireless device during the delay.

The wireless device connectivity context may refer to a user equipment radio and connectivity configuration context. The wireless device connectivity context may comprise radio bearer parameters that define one or more radio bearers allocated to the wireless device at the time of receiving the current detach request from the wireless device.

The detach requests may comprise one or more switch off detach requests. The detach request may comprise one or more packet system detach requests, such as evolved packet system (EPS) detach requests.

The wireless access network may be a cellular network.

The frequency of the radio network connectivity release requests may be determined for each burst of radio network connectivity release request messages. The determining whether the radio network connectivity release request frequency meets a first threshold may be set positive if greater than a first proportion during a first duration or if greater than a second proportion during a second duration, wherein the first proportion is greater than the second proportion and the second duration is greater than the first duration.

The determining whether the radio network connectivity release request frequency meets a first threshold may be set positive if K last radio network connectivity release requests were received from the wireless device within a first duration of time T1, wherein K>1. The determining whether the radio network connectivity release request frequency meets a first threshold may be alternatively set positive if K+dK last radio network connectivity release requests were received from the user equipment within a second duration of time T2, wherein dK>1 and T2>T1. (K+dK)/T2 may be less than K/T1. K and T1 may be constants. Alternatively, at least one of K and T1 may be dynamically adjusted. The dynamic adjusting may be based on any of user data amount; network congestion; network signaling amount; past behavior of the user equipment; time of day; day of week; day of month; or any network usage parameter. K may be greater than 3, 4, 5, 10 or 20. K/T1 may be at least ½ s; ¼ s; ⅕ s; ⅒ s; ⅟₃₀ s or ⅟₁₀₀ s. (K+dK)/T2 may be less than K/T1 by at least 1%; 5%; 10%; 20%; 50%; or 75%.

The radio network connectivity release reject message may be sent to the user equipment as the first corrective action on receiving a radio network connectivity creation request from the user equipment.

The radio network connectivity release reject message may be combined with next radio network connectivity creation accept message if the radio network connectivity release reject message could not be successfully sent to the user equipment before If it is determined that the radio network connectivity release request frequency does not meet the first threshold, normal processing of the radio network connectivity release request may be caused. Alternatively, the method may comprise taking second corrective action if at least L radio network connectivity release requests have been received within the second duration of time even if the radio network connectivity release request frequency does not meet the first threshold. The second corrective action may comprise or be any of: neglecting the current radio network connectivity release request; suspending the connectivity with a suspend command from the wireless network; increasing the delay during which the wireless device should not send new radio network connectivity release requests; sending a keep-alive transmission to the wireless device during the delay; sending a keep-alive transmission to a given port of the wireless device during the delay; and responding to the current radio network connectivity release request with a radio network connectivity release reject message indicating that the wireless device should maintain its wireless device connectivity context with the network despite of the current radio network connectivity release request.

The method may comprise taking the second corrective action more than once before taking the first corrective action or even though the first corrective action would not be taken.

On receiving from the user equipment one radio network connectivity release request message, a radio network connectivity release count timer may be started to monitor the frequency of the radio network connectivity release request messages if not already running. While the radio network connectivity release count timer is running, a count of received radio network connectivity release requests may be determined and if said count exceeds a threshold count before the count timer expires, it may be determined that the first threshold is met.

According to a second example aspect of the present invention, there is provided a method in a wireless device, comprising:

sending a radio network connectivity creation request to a wireless network;

establishing the requested radio network connectivity if accepted by the network and using the radio network connectivity to communicate over the wireless network;

sending a radio network connectivity release request message to the wireless network;

receiving a postponement signal indicative that the wireless network desires to postpone releasing of the radio network connectivity; and based on postponement signal, adopting a delay in sending next radio network connectivity release request message.

The postponement signal may comprise a radio network connectivity release reject message. The wireless device may responsively prolong maintaining of the radio network connectivity. The radio network connectivity release reject message may define a delay over which the wireless device should prolong the maintaining of the radio network connectivity.

The postponement signal may comprise a keep-alive transmission. The keep-alive transmission may be addressed to a given port. The port may be an internet protocol port.

According to third example aspect of the present invention, there is provided an apparatus comprising at least one processor configured to perform the method of the first or second example aspect.

According to a fourth example aspect of the present invention, there is provided a computer program comprising computer executable program code configured to execute any method of the first or second example aspect.

The computer program may be stored in a computer readable memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 1 shows an architectural drawing of a system of an example embodiment;

FIG. 2 shows a block diagram of an apparatus of an example embodiment;

FIG. 6 shows a simplified block diagram illustrating a method in a wireless device.

DETAILED DESCRIPTION OF THE DRAWINGS

Figure 3:
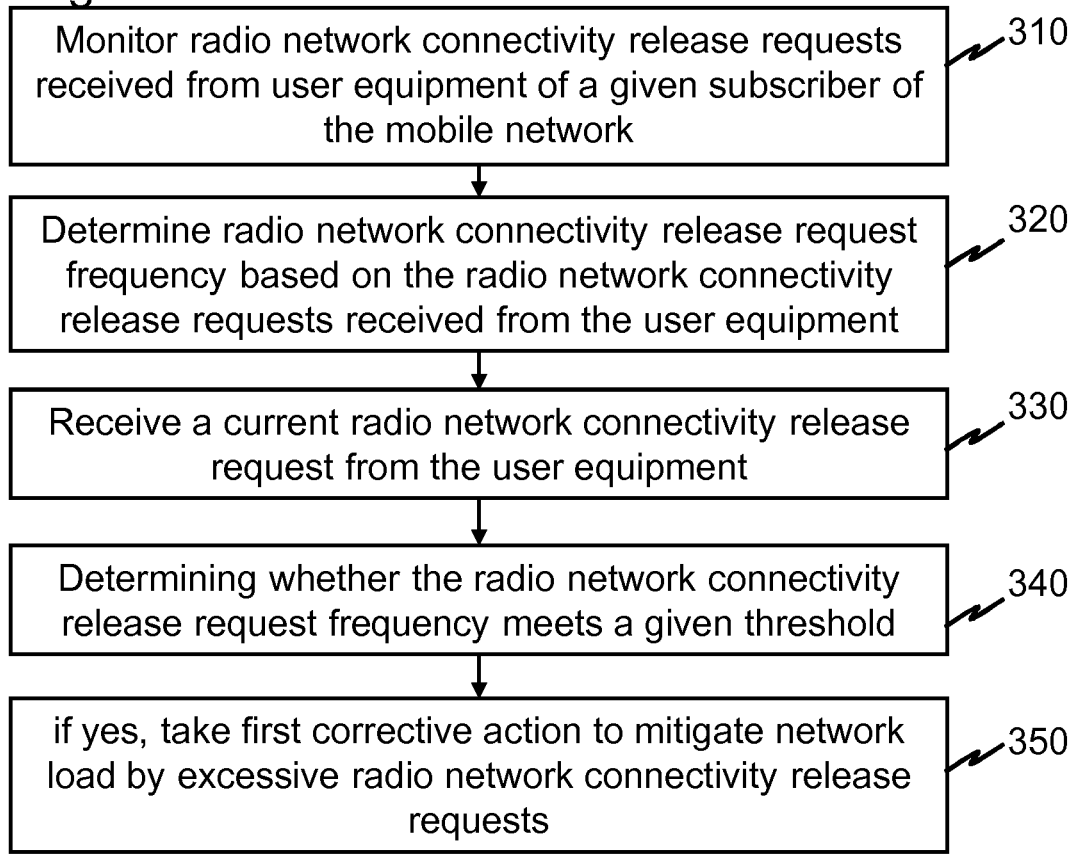
FIG. 3 shows a flow chart of a process of an example embodiment in a wireless network.

An example embodiment of the present invention and its potential advantages are understood by referring to FIGS. 1 through 6 of the drawings. In this document, like reference signs denote like parts or steps.

FIG. 1 shows an architectural drawing of a system of an example embodiment. In FIG. 1, there are plural wireless devices 110 such as Machine Type Devices (Internet of Things devices) and smart phones configured to communicate using an Internet 120 that interconnects plural wireless networks 130. The wireless networks 130 comprise, for example, cellular networks. The system of FIG. 1 further comprises respective radio access equipment 140 for implementing a radio interface to wirelessly communicate with the wireless devices 110. The wireless networks 130 of FIG. 1 further comprise respective core networks 150 configured to take care of functions such as an Evolved Packet Core (EPC) or a General Packet Radio Service core network. Notice that the wireless networks may differ from each other by any of type, capacity, geographic service area and/or operators who manage the wireless networks.

In order to gain connectivity, the wireless devices 110 are provided with subscriber data (e.g. with a subscriber identity module, not shown) and configured to request wireless network connectivity for data transmission through the wireless network 130. The wireless network connectivity can be obtained by sending a radio network connectivity request. In this document, the radio network connectivity request refers to a request for non-access stratum (NAS) or radio resource control (RRC) connection. For example, a NAS radio network connectivity request may be an attach request to acquire one or more radio bearers to their disposal for data transmission. The network attach in itself is a process well-known from the Wide-band Code Division Multiple Access (W-CDMA) or Universal Mobile Telecommunication System (UMTS) currently used as a 3G cellular standard in Europe, for example, as well as in the Long Term Evolution (LTE), for example. Correspondingly, the NAS radio network connectivity may be released by sending from the wireless device 110 a detach request. In case of RRC radio network connectivity, the connectivity can be released by the wireless device 110 by sending an RRC connection release request to the wireless network 130. In either case, the wireless device can request and the wireless network 130 may grant releasing of connectivity, but if performed too often, the connectivity should rather be maintained instead of repeatedly released.

FIG. 2 shows a block diagram of an apparatus 200 according to an embodiment of the invention. The apparatus 200 can be implemented in numerous ways to provide necessary functionality and capacity. FIG. 2 shows a functional block diagram of one example, in which the apparatus 200 comprises a memory 240 including computer program code 250. The apparatus 200 further comprises a processor 220 for controlling the operation of the apparatus 200 using the computer program code 240, a communication unit 210 for communicating with other nodes and with the cryptocurrency network. The communication unit 210 comprises, for example, a local area network (LAN) port; a wireless local area network (WLAN) unit; Bluetooth unit; cellular data communication unit for communicating with a cellular network; and/or satellite data communication unit for communicating with a satellite network. The processor 220 comprises, for example, any one or more of: a master control unit (MCU); a microprocessor; a digital signal processor (DSP); an application specific integrated circuit (ASIC); a field programmable gate array; and a microcontroller. The apparatus 200 of FIG. 2 is further drawn to comprise a user interface 230 (e.g. any a display, projector, one or more keys, keypads or keyboards, speaker, microphone, speech recognition circuitry, speech synthesis circuitry).

In case that the apparatus 200 is embodied as the wireless device 110, that is an Internet of Things device, the apparatus 200 comprises in an example embodiment some sensors and/or actuators for performing some measuring and/or actuating functions (e.g. opening locks, switching or adjusting lights or temperature, steering or controlling machines etc.). The apparatus 200 can also be embodied as a smart phone, for example.

In case that the apparatus 200 is embodied as a network apparatus for controlling operation of the wireless network 130 (e.g. as a core network functionality), the apparatus itself may lack wireless communication ability but instead employ the radio access equipment 140 for that. When embodied to control the wireless network 130 to function according to an example embodiment of the invention, the apparatus 200 can be implemented as a dedicated unit that is configured to coordinate operation of existing core network functionalities such as Mobility Management Entity (MME); Serving Gateway (SGW); PDN Gateway (PGW); Home Subscriber Server (HSS); Access Network Discovery and Selection Function (ANDSF); and/or Evolved Packet Data Gateway (ePDG).

Like the implementation of the core network may vary so that some entities can be distributed or combined with other entities, the apparatus 200 may also be implemented as a dedicated entity that may even be distributed or cloud based function, or the apparatus 200 may also be implemented jointly with one or more of the other entities of the core network. Moreover, the core network 150 may be at least partly joined with the radio access equipment 140 depending on the implementation. Generally, the apparatus 200 when controlling the wireless network 130 may be perceived as an automatically operating apparatus capable of controlling operation of the wireless network 130 according to some example embodiment of the invention.

FIG. 3 shows a flow chart of a process of an example embodiment in a wireless network. The method comprises:

310 monitoring radio network connectivity release requests received from a user equipment of a given subscriber of the wireless network;

320 determining a radio network connectivity release request frequency based on the radio network connectivity release requests received from the user equipment;

330 receiving a current radio network connectivity release request from a user equipment of a given subscriber of the wireless network;

340 determining whether the radio network connectivity release request frequency meets a first threshold and:

350 if yes, taking first corrective action to mitigate network load by excessive radio network connectivity release requests.

In an example embodiment, the first corrective action comprises or is responding to the current radio network connectivity release request with a radio network connectivity release reject message indicating that the user equipment should maintain its wireless device connectivity context with the network despite of the current radio network connectivity release request.

The radio network connectivity release reject message may be associated with a set delay during which the wireless device 110 should not send new radio network connectivity release requests. The set delay may be monitored with a particular radio network connectivity release delay timer. The radio network connectivity release reject message may comprise a definition of the radio network connectivity release delay timer for the wireless device 110. The wireless device 110 is configured to monitor trigger the radio network connectivity release delay timer on receiving the radio network connectivity release reject message accordingly and abstain from sending new radio network connectivity release requests until the radio network connectivity release reject delay timer has elapsed one or more times (e.g. five times). The duration of the radio network connectivity release reject delay timer may be initially set to a default value, such as 15 seconds. In an example embodiment, the duration of the radio network connectivity release reject delay timer is adapted by the wireless network 130. The radio network connectivity release reject message associated with the set delay in which the wireless device 110 should not send new radio network connectivity release requests may help to avoid redundant traffic caused by transmission of new requests as could happen otherwise.

In an example embodiment, the wireless device connectivity context refers to a user equipment context. In an example embodiment, the user equipment context comprises radio bearer parameters that define one or more radio bearers allocated to the user equipment at the time of receiving the current radio network connectivity release request from the user equipment.

In an example embodiment, the radio network connectivity release requests comprise one or more switch off detach requests. In an example embodiment, the radio network connectivity release requests comprise one or more packet system detach requests, such as evolved packet system (EPS) detach requests.

Figure 4:
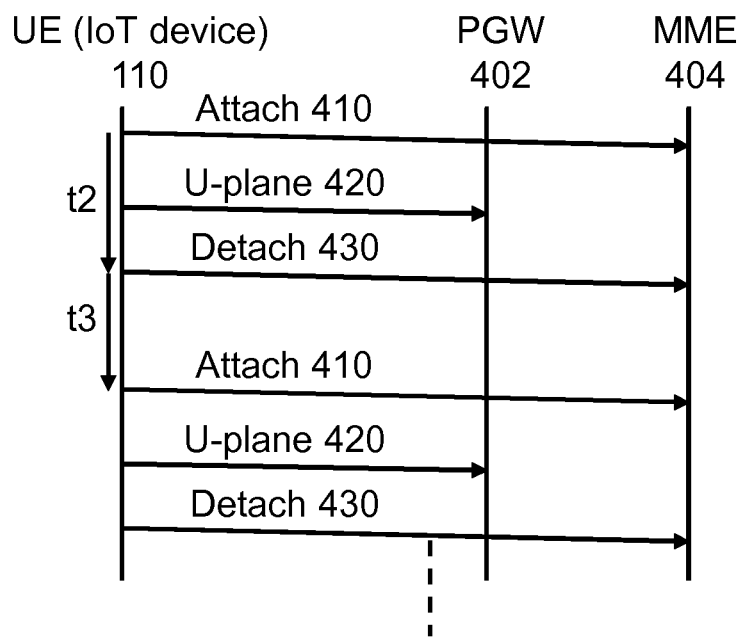
FIG. 4 shows a simplified signaling chart of an example embodiment.

FIG. 4 shows a signaling chart of an example embodiment simplified for clarity to only show messages relevant for understanding an example embodiment of the invention. FIG. 4 uses the detach requests as an example of radio network connectivity release requests. FIG. 4 shows some signals from a UE 110 attaching to the wireless network 130 with a PDG gateway PGW 402 and a Mobility Management Entity MME 404.

The wireless device 110, here denoted as UE, sends through to the MME 404 an attach message 410. Then the UE 110 sends 420 a little data (potentially just a few bytes) on user plane (u-plane) to the PGW 402 and then detaches from the network 130 with a UE initiated detach request 430 to the MME 404 shortly after (within time t2 from the first attach message 410). A short period of time (t3) after the detach request 430, the UE 110 sends a new attach request 410, followed by further u-plane data transfer 420, new detach request 430 and so on.

The repetitive detaching behavior leads to plenty of unnecessary control plane (c-plane) load provided t3 is very small, like for instance below 5 seconds. Under those circumstances it would be often better to not close the connection in the first place and avoid additional c-plane load due to the subsequent detach and attach messages. However as this is a UE initiated detach procedure, the network cannot control this behavior without corrective action provided by an example embodiment of the invention.

In an example embodiment, particular radio network connectivity release down counter and radio network connectivity release delay timer are used to detect the excessive radio network connectivity releasing problem and to trigger corrective action. For example, when the radio network connectivity release counter exceeds a certain network set by the radio network connectivity release delay timer period, corrective actions towards the UE are triggered.

Figure 5:
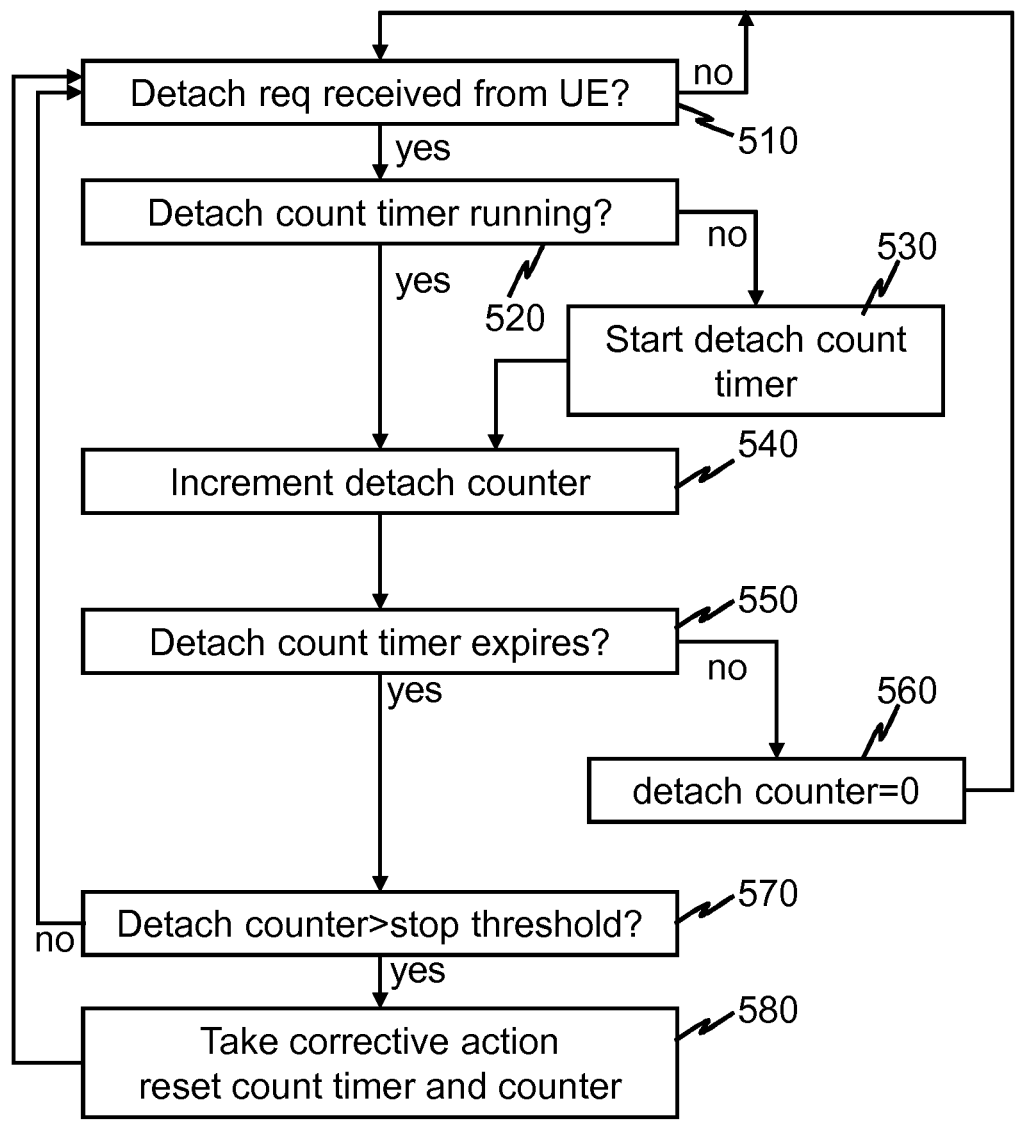
FIG. 5 shows a simplified flow chart of an example embodiment.

FIG. 5 shows a simplified flow chart of an example embodiment. It is checked 510 whether a detach request message is received from the UE. If no, this step is repeated until such a message is received and the process advances to checking 520 whether a detach count timer (radio network connectivity release delay timer) is running. The detach count timer of FIG. 5 is started upon receiving a UE initiated detach request message. If no, the detach count timer is started at 530. The counter is initiated at a network configured value corresponding to a set first duration of time and counts down, stopping at zero. The process then continues in either case to increment 540 a detach counter by one (that is originally initialized to zero). Then, it is checked 550 whether the detach count timer expires i.e. a first duration of time has elapsed. If yes, the detach counter is reset 560 to zero and the process resumes to step 510. If no, the process continues to checking 570 whether the detach counter exceeds a stop threshold indicative of the frequency of detach requests having met a first threshold. If no, the process resumes to step 510, otherwise the first corrective action is taken 580. The detach counter and the detach count timer are also reset here in an example embodiment. Then, the process resumes to step 510.

When the detach problem is detected and corrective action is triggered, e.g. an MME replies to the wireless device 110 that the detach request is refused. This reply comprises in an example embodiment the additional information that the wireless device 110 is not allowed to detach until further notice or until the radio network connectivity release delay timer has expired by set number of times (e.g. one or five times). Notice that the detach request may be a power off detach request and wireless device 110 may power off. In this case, the wireless device 110 may attempt to trigger a detach procedure but be unable to receive a reply from the network. The wireless device 110 can then be provided by the network (the MME, for example) with a detach reject message responsive to its next attach and/or detach request. Responsive to receiving a detach reject message, whether as such or possibly combined to another message such as to an attach request response, the wireless device 110 should follow this command and not actually detach despite the earlier sent detach request. In this case, U-plane traffic is transferred as also otherwise, but the wireless device 110 need not carry out all the signaling required by the detach/attach processes including authentication and allocation of radio bearers.

If the detach request of the wireless device 110 is not accepted, the wireless device 110 and the wireless network 130 maintain in an example embodiment some or all of the wireless device connectivity context of the wireless device 110.

The control of radio network connectivity release processes of different wireless devices 110 can be adapted based on network conditions and/or wireless device specifically. For example, the network 120 can set the values of the detach counter and Detach count timer based on application of the wireless device 110 that needs the connectivity, type of the wireless device 110, subscription type, and/or past behavior of the wireless device. In an example embodiment, the wireless network 130 is configured to track behavior wireless devices (e.g. individually or in one or more groups of them) related to the signaling. For example, IoT Vehicle to Everything (V2X) wireless devices be treated differently than IoT Massive Machine-Type Communications (mMTC) devices.

In an example embodiment, the wireless device 110 is allowed to return to legacy behavior in order to test whether the misbehaving behavior was temporary. For example, the network is configured in an example embodiment to command the wireless device 110 to perform wireless device initiated radio network connectivity release is allowed again. Then again, if the radio network connectivity release delay timer is used during (given number of expiry times of) which wireless device 110 initiated radio network connectivity release is not allowed, after the timer (or its given multiple) expires, the wireless device 110 returns to legacy mode.

In an example embodiment, the wireless device 110 is adapted to detect from a received radio network connectivity release reject message one or more conditions for subsequent radio network connectivity release request messages and to abstain from sending new radio network connectivity release request messages according to said conditions.

In an example embodiment, the frequency of the radio network connectivity release requests is determined for each burst of radio network connectivity release messages. In an example embodiment, the determining whether the radio network connectivity release request frequency meets a first threshold is set positive if greater than a first proportion during a first duration or if greater than a second proportion during a second duration wherein the first proportion is greater than the second proportion and the second duration is greater than the first duration.

For example, the determining whether the radio network connectivity release request frequency meets a first threshold can be deemed or set positive if K last radio network connectivity release requests were received from the user equipment within a first duration of time T1, wherein K>1. In an example embodiment, the determining whether the radio network connectivity release request frequency meets a first threshold is alternatively set positive if K+dK last radio network connectivity release requests were received from the user equipment within a second duration of time T2, wherein dK>1 and T2>T1. (K+dK)/T2 is less than K/T1.

In a simple case, K and T1 are constants. In an alternative example embodiment, at least one of K and T1 is dynamically adjusted. The dynamic adjusting can be based on, for example, any of network congestion; network signaling amount; past behavior of the user equipment; time of day; day of week; day of month; or any network usage parameter. In an example embodiment, K is greater than 3, 4, 5, 10 or 20. In an example embodiment, K/T1 is at least ½ s; ¼ s; ⅕ s; ⅒ s; ⅟30 s or ⅟100 s. In an example embodiment, (K+dK)/T2 is less than K/T1 by at least 1%; 5%; 10%; 20%; 50%; or 75%.

In an example embodiment, the radio network connectivity release reject message is sent to the user equipment on receiving a radio network connectivity creation request from the user equipment if the radio network connectivity release reject message could not be successfully sent to the user equipment before.

In an example embodiment, the radio network connectivity release reject message is combined with next radio network connectivity creation accept message.

If it is determined that the radio network connectivity release request frequency does not meet the first threshold, normal processing of the radio network connectivity release request is caused in an example embodiment. In an example alternative embodiment, the method comprises taking second corrective action if at least L radio network connectivity release requests have been received within the second duration of time even if the radio network connectivity release request frequency does not meet the first threshold. In an example embodiment, the second corrective action is selected to comprise or be any of: neglecting the current radio network connectivity release request; suspending the connectivity with a suspend command from the wireless network; increasing the delay during which the wireless device should not send new radio network connectivity release requests; sending a keep-alive transmission to the wireless device during the delay; sending a keep-alive transmission to a given port of the wireless device during the delay; and responding to the current radio network connectivity release request with a radio network connectivity release reject message indicating that the wireless device should maintain its wireless device connectivity context with the network despite of the current radio network connectivity release request.

In an example embodiment, the method comprises taking the second corrective action more than once before taking the first corrective action or even though the first corrective action would not be taken.

FIG. 6 shows a simplified block diagram illustrating a method in the wireless device 110, comprising:

610 sending a radio network connectivity creation request to a wireless network;

620 establishing the requested radio network connectivity if accepted by the network and using the radio network connectivity to communicate over the wireless network;

630 sending a radio network connectivity release request message to the wireless network;

640 receiving a postponement signal indicative that the wireless network desires to postpone releasing of the radio network connectivity; and 650 based on postponement signal, adopting a delay in sending next radio network connectivity release request message.

In an example embodiment, the postponement signal comprises a radio network connectivity release reject message. In an example embodiment, the wireless device responsively prolongs maintaining of the radio network connectivity. In an example embodiment, the radio network connectivity release reject message defines a delay over which the wireless device should prolong the maintaining of the radio network connectivity.

In an example embodiment, the wireless device is configured to start a radio network connectivity release timer on sending the radio network connectivity release request message to the wireless network. This radio network connectivity release timer can be used selectively by the wireless device 110 depending on whether the postponement signal has been received. In a normal state, the wireless device 110 then repeats sending the radio network connectivity release request on expiry of the radio network connectivity release delay timer up to a given number of times (e.g. 4 or 5 times). In a prolonging state, the wireless device 110 abstains from repeating the sending the radio network connectivity release request messages. Until the radio network connectivity release delay timer has expired by the given number times, the wireless device 110 monitors in an example embodiment whether new user data transmission occurs with the wireless device 110 over the wireless network 130. If yes, the wireless device then abandons current radio network connectivity release request process and stops or pauses sending new radio network connectivity release requests to the wireless network. Correspondingly, the wireless network 130 can be configured to also neglect (possibly without sending any particular rejection message to the wireless device 110) the radio network connectivity release request if new user data transmission occurs with the wireless device 110 over the wireless network 130.

In an example embodiment, the postponement signal comprises a keep-alive transmission. The keep-alive transmission may be addressed to a given port such as an internet protocol port. The port may be fixedly defined. The port may be set by the wireless network 130 or by the wireless device 110. The port may be the port used by the wireless device 110 in its communication over the wireless network 130 and observed by the wireless network 130.

Without in any way limiting the scope, interpretation, or application of the claims appearing below, a technical effect of one or more of the example embodiments disclosed herein is that a mobile communication network may detect and take counter-actions for device misbehaviors or undesired behavior related to control plane procedures and reduce unnecessary control plane load in case of such behavior. Another technical effect of one or more of the example embodiments disclosed herein is that problems caused by expected enormous growth of IoT devices in the c-plane load may be mitigated. Yet another technical effect of one or more of the example embodiments disclosed herein is that battery usage of battery operated wireless devices may decrease by reducing repetitions of attach/detach processes that require processing power and/or radio signaling.

Embodiments of the present invention is implemented in software, hardware, application logic or a combination of software, hardware and application logic. In an example embodiment, the application logic, software or an instruction set is maintained on any one of various conventional computer-readable media. In the context of this document, a "computer-readable medium" is any non-transitory media or means that can contain, store, communicate, propagate or transport the instructions for use by or in connection with an instruction execution system, apparatus, or device, such as a computer, with one example of a computer described and depicted in FIG. 2. A computer-readable medium comprises a computer-readable storage medium that is any media or means that can contain or store the instructions for use by or in connection with an instruction execution system, apparatus, or device, such as a computer.

If desired, the different functions discussed herein is performed in a different order and/or concurrently with each other. Furthermore, if desired, one or more of the before-described functions is optional or is combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which is made without departing from the scope of the present invention as defined in the appended claims.

The invention claimed is:

1. An apparatus comprising:
   at least one processor; and
   at least one memory including computer program code;
   the at least one memory and the computer program code configured to, with the at least one processor, cause the apparatus at least to perform:
   monitor radio network connectivity release requests received from a wireless device of a given subscriber of a wireless network;
   determine a radio network connectivity release request frequency based on the radio network connectivity release requests received from the wireless device;
   receive a current radio network connectivity release request from the wireless device;
   determine whether the radio network connectivity release request frequency meets a first threshold; and
   in an instance that the radio network connectivity release request frequency is determined to meet the first threshold, cause a first corrective action to be taken, wherein the first corrective action comprises or is responding to the current radio network connectivity release request with a radio network connectivity release reject message indicating that the wireless device should maintain its wireless device connectivity context with the wireless network despite the current radio network connectivity release request.

2. The apparatus of claim 1, wherein the wireless device connectivity context refers to a wireless device connectivity context.

3. The apparatus of claim 1, wherein the first corrective action comprises any of: neglecting the current radio network connectivity release request; suspending the connectivity with a suspend command from the wireless network; increasing the delay during which the wireless device should not send new radio network connectivity release requests; sending a keep-alive transmission to the wireless device during the delay; and sending a keep-alive transmission to a given port of the wireless device during the delay.

4. The apparatus of claim 1, wherein the radio network connectivity release reject message is associated with a set delay during which the wireless device should not send new radio network connectivity release requests to the wireless network.

5. The apparatus of claim 1, wherein the radio network connectivity release reject message is combined with next radio network connectivity creation accept message if a delivery failure indication is received that the radio network connectivity release reject message delivery to the wireless device had failed.

6. The apparatus of claim 5, wherein the delivery failure indication is receiving a new radio network connectivity creation request message.

7. The apparatus of claim 1, wherein the radio network connectivity release reject message is combined with next radio network connectivity creation accept message.

8. The apparatus of claim 1, wherein the radio network connectivity release requests comprise one or more switch off detach requests.

9. The apparatus of claim 1, wherein the radio network connectivity release requests comprise one or more packet system detach requests.

10. The apparatus of claim 1, wherein the wireless network is a cellular network.

11. The apparatus of claim 1, wherein the determining of whether the radio network connectivity release request frequency meets the first threshold depends on at least one of network conditions and wireless device behavior.

12. The apparatus of claim 11, wherein the behavior of wireless devices is tracked and the first threshold is adapted accordingly.

13. A non-transitory computer readable medium comprising program instructions stored thereon for performing at least the following:
   monitoring radio network connectivity release requests received from a wireless device of a given subscriber of a wireless network;
   determining a radio network connectivity release request frequency based on the radio network connectivity release requests received from the wireless device;
   receiving a current radio network connectivity release request from the wireless device;
   determining whether the radio network connectivity release request frequency meets a first threshold; and
   in an instance that the radio network connectivity release request frequency is determined to meet the first threshold, causing a first corrective action to be taken, wherein the first corrective action comprises or is responding to the current radio network connectivity release request with a radio network connectivity release reject message indicating that the wireless device should maintain its wireless device connectivity context with the wireless network despite the current radio network connectivity release request.

14. An apparatus comprising:
   at least one processor; and
   at least one memory including computer program code;
   the at least one memory and the computer program code configured to, with the at least one processor, cause the apparatus at least to perform:
   monitor radio network connectivity release requests received from a wireless device of a given subscriber of a wireless network;
   determine a radio network connectivity release request frequency based on the radio network connectivity release requests received from the wireless device;
   receive a current radio network connectivity release request from the wireless device;
   determine whether the radio network connectivity release request frequency meets a first threshold based on at least one of network conditions and wireless device behavior, wherein the behavior of wireless devices is tracked and the first threshold is adapted accordingly; and
   if yes, taking first corrective action, wherein the first corrective action comprises or is responding to the current radio network connectivity release request with a radio network connectivity release reject message indicating that the wireless device should maintain its wireless device connectivity context with the wireless network despite the current radio network connectivity release request.

\* \* \* \* \*